United States Patent [19]

Ladouceur

[11] 4,313,261
[45] Feb. 2, 1982

[54] NUT INSTALLATION APPARATUS

[75] Inventor: Harold A. Ladouceur, Livonia, Mich.

[73] Assignee: Multifastener Corporation, Detroit, Mich.

[21] Appl. No.: 111,452

[22] Filed: Jan. 11, 1980

[51] Int. Cl.³ .................... B23P 19/04; B23Q 7/10
[52] U.S. Cl. .................................................. 29/798
[58] Field of Search ............... 29/432, 509, 798, 809, 29/813, 816, 818; 227/61, 86, 116, 149

[56] References Cited

U.S. PATENT DOCUMENTS

| | | | |
|---|---|---|---|
| 3,718,965 | 3/1973 | Steward | 29/798 |
| 3,921,276 | 11/1975 | Oaks | 29/798 |
| 3,926,236 | 12/1975 | Pouch et al. | 411/179 |

*Primary Examiner*—Ervin M. Combs
*Attorney, Agent, or Firm*—Cullen, Sloman, Cantor, Grauer, Scott & Rutherford

[57] ABSTRACT

An explosion relief for a nut installation head or apparatus, such as used to install pierce or pierce-clinch nuts having a rectangular piercing pilot and opposed elongated flange portions on opposite sides of the pilot. The flanges are separated from the pilot portion by panel receiving grooves. The improved explosion relief comprises aligned channels extending from opposed sides of the rectangular nut plunger passage which receive the nut flanges at the passage opening. One side wall of the channel is aligned with a wall of the passage and the opposed side channel wall is off-set inwardly from the passage wall to define corners in the plunger passage which catch and rotate the elongated nut flanges in the event that a nut is fractured during installation. The elongated nut flanges are thus guided outwardly through the explosion relief channels without jamming the nut installation head.

3 Claims, 4 Drawing Figures

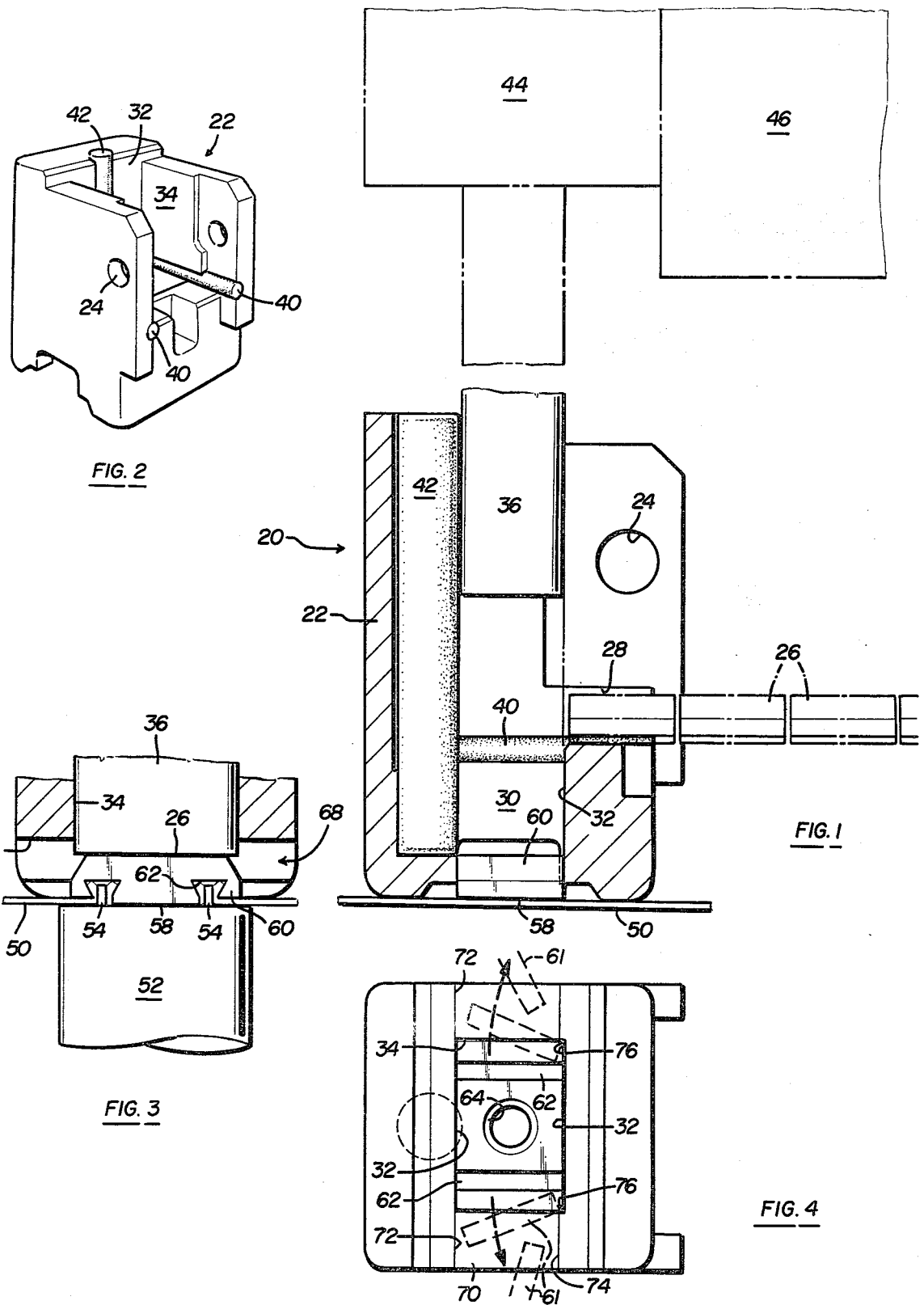

NUT INSTALLATION APPARATUS

FIELD OF THE INVENTION

The present invention relates to an improvement in a nut installation head or apparatus for securing pierce or pierce-clinch nuts in a panel. More particularly, this invention relates to an explosion relief particularly suitable for a pierce nut installation head used to install pierce nuts having a rectangular pilot portion and elongated flange portions located on opposite sides of the pilot and separated from the pilot by panel receiving grooves. A pierce nut of this type is shown in U.S. Pat. No. 3,648,747 and a clinch nut of this type is shown in U.S. Pat. No. 3,829,957. Both patents are assigned to the Assignee of the present invention.

Pierce nut installation heads generally include a nut passage which receives the nuts in serial alignment and a transverse plunger passage which receives the nuts from the nut passage. The plunger passage has a reciprocating plunger therein for transferring the nuts through the plunger passage and installing the nuts in a panel or other structural member opposite the opening to the plunger passage. A pierce nut installation head is shown in U.S. Pat. No. 3,971,116, assigned to the Assignee of the instant application. Under general operating conditions, one nut is installed with each stroke of the nut installation plunger. Nut installation heads of this type are generally located in a panel forming die press, wherein the panel is formed and the nuts are installed, simultaneously, in one stroke of the die. A problem may develop when the die is recycled, wherein the installation head attempts to install two nuts in the same location in the panel. For example, during startup, the die may be cycled more than once to adjust the forming pressure. The pierce nut is then fractured and the flange portions are exploded laterally, jamming the pierce nut installation head, possibly damaging the head and requiring replacement.

This problem has been solved for universal pierce nuts by providing explosion relief channels extending from opposed sides of the plunger passage, at the open end. The channels receive the nut flange fragments of the installed nut and the pilot portion is forced through the panel as disclosed in U.S. Pat. No. 3,718,965, assigned to the Assignee of the instant application.

The explosion relief disclosed in U.S. Pat. No. 3,926,236 does not, however, accommodate pierce nuts of the type disclosed in U.S. Pat. No. 3,648,747 because the larger elongated flanges tend to jam within the channels. The explosion relief of the present invention solves this problem in a simple manner by rotating the fractured flange portions about corners provided at the junction between the plunger passage and the channels to explode the flanges longitudinally through the explosion relief channels as described hereinbelow.

SUMMARY OF THE INVENTION

As described above, the improved installation head or apparatus of this invention is particularly adapted to the installation of pierce or pierce-clinch nuts having a rectangular pilot portion and opposed elongated flange portions extending along opposite sides of the pilot and separated from the pilot portion by panel receiving grooves. The pierce nut preferably includes a flat piercing face on the pilot portion and the end faces of the flanges are preferably parallel to but spaced from the piercing face. In a clinch nut, the end faces of the flanges may be aligned with the end face of the pilot. The nut includes a bore, through the pilot, perpendicular to the end face. The bore may be prethreaded, particularly in a pierce nut, or threaded after installation.

The pierce nut installation head includes a plunger passage receiving nuts for installation through an open end of the passage and a plunger reciprocating within the passage transferring the nuts received within the passage through the open end into engagement with the panel opposite the passage. In a pierce nut installation head, the projecting pilot portion pierces its own hole in the panel and the panel edge is displaced into the nut receiving grooves to lock the nut on the panel. In a pierce clinch nut installation head, the nut may be deformed over the nut grooves to improve the retention of the nut on the panel. In a clinch nut, the panel may simply be deformed into the nut grooves without piercing the pilot through the panel. The plunger passage is generally rectangular to conform to the shape of the nuts and guide the nuts through the passage for installation. The plunger passage includes side walls which receive the nut flanges and opposed end walls which receive the sides of the pilot portion.

The improved explosion relief of this invention comprises opposed and aligned channels including opposed side walls and a bottom wall generally perpendicular to the plunger passage. One side wall of the channel is aligned with a wall of the nut passage and the opposed side channel wall is off-set inwardly from the opposed passage side wall to define two opposed corners at the junction of the plunger passage and the explosion relief channels. These corners catch and rotate the nut flanges in the event that the flanges are fractured during installation, as when the installation head is recycled to overhit the same panel as described above. When the nut is fractured, the elongated flange portions are rotated in the corners to explode longitudinally through the explosion relief channels to avoid jamming of the installation head.

BRIEF DESCRIPTION OF THE DRAWINGS

FIG. 1 is a side partially cross-sectioned view of one embodiment of the nut installation apparatus of this invention with the die components and nuts shown in phantom;

FIG. 2 is a side elevation of the pierce nut installation nose assembly shown in FIG. 1;

FIG. 3 is a partial end view, partially cross-sectioned, of the nut installation head, including a die member, as a nut is installed in a panel; and FIG. 4 is a bottom view of the nose assembly, as shown in FIG. 1, with the panel removed and showing the path of the nut flange fragments, shown in phantom.

DESCRIPTION OF THE PREFERRED EMBODIMENTS

The pierce nut installation head 20 shown in FIG. 1 is representative of the general type of installation heads used commercially to install pierce, clinch and pierce clinch nuts. In the disclosed embodiment, a separate nose assembly 22 is provided for convenience of installation, maintenance and repair. The nose assembly is connected to a reciprocating housing element, not shown, by connector holes 24. Pierce nuts 26 are received through nut passage 28 into a transverse plunger passage 30. The plunger passage is preferably rectangular to conform to the rectangular shape of the nuts to be installed, including opposed side walls 32 and end walls 34. A plunger 36 reciprocates within the plunger passage to install the pierce nuts as described hereinbelow.

In the disclosed embodiment, the nose assembly includes resilient guide rails 40 which support the nuts in the plunger passage and a transverse resilient guide rail 42 guides the nuts as they are forced downwardly by the plunger. The plunger is supported by a support member 44, such as a die platen, which also supports the stationary housing member 46.

The operation of a pierce nut installation head is briefly as follows. The nuts 26 are received through the nut passage 28 into the plunger passage 30. The nuts are serially aligned for installation in the panel 50. A feed means, such as a feed pawl or spring biased chuck feeds one nut 26 beneath the plunger 36 with each stroke of the die platen 44. In the disclosed embodiment, the nut is supported beneath the plunger on resilient rails 40. The plunger 36 moves downwardly in FIG. 1 with the platen 44. The plunger first engages a nut resiliently supported on rails 40. As the plunger continues its downward movement, the nut is guided through plunger passage 30 into engagement with panel 50 opposite the plunger passage.

The pierce nuts installed in FIGS. 1, 3 and 4, include a rectangular pilot portion 58, elongated flange portions 60 on opposed sides of the pilot portion, separated from the pilot portion by panel receiving grooves 62. A nut bore 64 extends through the pilot portion perpendicular to the flat end piercing face. As shown in FIG. 3, the panel 50 is supported on a die member 52 having rectangular projecting lips 54. As described in U.S. Pat. No. 3,648,747, the rectangular pilot portion pierces a rectangular hole in the panel and the lips 54 simultaneously deform the pierced panel edges into the nut grooves 62 to retain the nuts on the panel. The operation of the nut installation head 20 and the securement of the pierce nuts 26 in the panel 50 will be more fully understood from the above-referenced United States patents which are incorporated herein by reference.

The improvement defined herein resides in the explosion relief 68, which is particularly adapted to the installation of pierce or clinch nuts as described hereinabove. The explosion relief of this invention includes opposed aligned channels each having a bottom wall 70 and side walls 72 and 74. As best shown in FIG. 4, one side wall 72 of the channel is aligned with a side wall 32 of the plunger passage. The opposed side channel wall 74 is off-set or recessed inwardly from the opposed passage side wall 32 to define opposed corners 76 at the junction between the explosion relief channels and the plunger passage. In FIG. 3, a single pierce nut 26 has been installed in the panel 50 by plunger 36. The plunger is then retracted as shown in FIG. 1 and a second nut 26 is received within the plunger passage on guide rails 40. Under normal operating conditions, the nut and panel assembly is then removed and a new panel is received beneath the plunger passage. However, if the die is recycled without removing the nut and panel assembly, the nut installation head will attempt to install a second nut in the same location in the panel. Under this condition, the second nut will fracture the installed nut, exploding the flange portions 60 laterally and forcing the pilot portion through the panel. The explosion relief of the present invention will guide the flange portions harmlessly out of the installation head, as follows. As the flange portions 60 of the nuts are forced outwardly by the second nut, the flanges are fractured and rotated about corners 76 in the plunger passage as shown in phantom at 61 in FIG. 4. The flanges are thus turned and projected longitudinally through the explosion relief channel 68, thus eliminating jamming. The remaining pilot portion is forced through the panel and the second nut is installed in the panel without damaging the pierce nut installation head.

It will be understood that the explosion relief channels of this invention may be utilized in pierce-clinch and clinch nut installation apparatus as described hereinabove. Thus, the disclosed details of the pierce nut installation head 20 and pierce nuts 26 are considered examples only and may be modified within the purview of the appended claims which follow.

I claim:

1. A clinch nut installation apparatus for installing generally rectangular nuts in a panel, said nuts including a pilot portion having a generally rectangular end fact, a bore extending through said pilot portion end face perpendicular thereto, laterally extending flanges on opposite sides of said pilot portion and panel receiving grooves located between said flanges and said pilot portion, said installation apparatus including a plunger passage extending through an open end of said passage, said plunger passage receiving said nuts for installation in a panel opposite said passage open end, a plunger means reciprocating in said passage, said plunger means transferring nuts received within said passage out through said open passage end into engagement with a panel opposite said passage, said plunger passage having walls generally conforming to the rectangular cross section of said nuts including end walls and side walls conforming to said nut flange portions, the improvement comprising aligned explosion relief channels communicating with said open end, through said passage end walls, said explosion relief channels adapted to receive said nut flange portions when fractured from the pilot portion, said channels each having opposed side walls and a bottom wall generally perpendicular to said passage, one of said side walls of each channel generally alinged with a side wall of said rectangular passage and the opposed said side wall of each channel off-set inwardly from the opposed side passage wall, defining opposed corners in which said channels such that the width of said explosion relief channels is less than the width of the nut flanges, whereby flange portions fractured from said pilot portions are rotated and expelled outwardly through said channels without jamming in said passage.

2. A nut installation apparatus for installing nuts in a panel, said nuts including a central pilot portion having a generally flat end face, a bore extending through said pilot portion perpendicular to said end face, laterally extending flange portions on opposite sides of said pilot and panel receiving grooves located between said flanges and said pilot, said installation apparatus having a plunger passage, including opposed side walls and end walls receiving said nut flange portions during installation of the nut in a panel opposite said plunger passage and a plunger means reciprocating in said passage, said plunger means adapted to transfer a nut in said passage through an open end of said installation apparatus into a panel opposite said plunger passage, the improvement comprising explosion relief channels defined in said apparatus open end through said passage end walls and communicating with said passage, said explosion relief channels having opposed side walls and a bottom wall generally perpendicular to said plunger passage, one of said channel side walls aligned with a side wall of said passage and the opposed side walls of said channel off-set inwardly from the opposed passage side wall defining corners in said explosion relief channels, whereby flange portions fractured from said pilot portions are rotated in said channel corners and expelled outwardly through said channels without jamming end said passage.

3. An explosion relief for a nut installation head used to install pierce nuts having a rectangular piercing pilot and opposed elongated flanges on opposite sides of said pilot and separated from said pilot by panel receiving grooves, said head having a rectangular plunger passage opening through one end, said passage receiving said nuts and having opposed end walls conforming to the opposed nut flanges and perpendicular opposed side walls receiving the pilot portion of said nuts, the improvement comprising aligned channels extending through said opposed end walls of said plunger passage at the passage opening, said channels having opposed side walls and a bottom wall, one said channel wall being aligned with a side wall of said plunger passage and the opposed side channel wall off-set inwardly from the opposed plunger passage side wall to define corners in the nut passage which catch and rotate the elongated nut flanges in the event that a nut is fractured during installation, thereby guiding the elongated nut flanges outwardly through the explosion relief channels without jamming the head.

* * * * *